United States Patent
Báder et al.

(10) Patent No.: US 10,756,987 B2
(45) Date of Patent: Aug. 25, 2020

(54) TECHNIQUE FOR HANDLING SERVICE LEVEL RELATED PERFORMANCE DATA FOR ROAMING USER TERMINALS

(71) Applicant: Telefonaktiebolaget LM Ericsson (publ), Stockholm (SE)

(72) Inventors: Attila Báder, Paty (HU); Sándor Rácz, Cegléd (HU); Geza Szabo, Kecskemet (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/093,258

(22) PCT Filed: Apr. 28, 2016

(86) PCT No.: PCT/EP2016/059548
§ 371 (c)(1),
(2) Date: Oct. 12, 2018

(87) PCT Pub. No.: WO2017/186297
PCT Pub. Date: Nov. 2, 2017

(65) Prior Publication Data
US 2019/0215250 A1    Jul. 11, 2019

(51) Int. Cl.
*H04W 4/00* (2018.01)
*H04L 12/24* (2006.01)
(Continued)

(52) U.S. Cl.
CPC ...... *H04L 41/5032* (2013.01); *H04L 41/5009* (2013.01); *H04L 41/5019* (2013.01);
(Continued)

(58) Field of Classification Search
CPC ............ H04L 41/5032; H04L 41/5009; H04L 41/5019; H04L 41/5061; H04W 8/02; H04W 8/18; H04W 24/08; H04M 2215/34
See application file for complete search history.

(56) References Cited

U.S. PATENT DOCUMENTS

| 8,958,770 B2 | 2/2015 | Baldwin |
| 2005/0097209 A1* | 5/2005 | McDonagh ........... H04L 41/046 709/224 |

(Continued)

FOREIGN PATENT DOCUMENTS

| GB | 2406474 A | 3/2005 |
| WO | 03096729 A1 | 11/2003 |
| WO | 2014154263 A1 | 10/2014 |

OTHER PUBLICATIONS

Pixipnet, "Xroam Whitepaper—Product Info—Grlobal Roaming Quality Platform—The Unique worldwide quality of roaming monitoring platform", Nov. 5, 2015, pp. 1-6, retrieved on Jan. 5, 2017, retrieved from internet: http://www.pixip.net/pixip/docs/whitepapers/XRoam_Whitepaper.pdf.

*Primary Examiner* — Barry W Taylor
(74) *Attorney, Agent, or Firm* — Coats + Bennett, PLLC

(57) ABSTRACT

A technique for validating Service Level Agreements (SLAs) for roaming user terminals is presented. A method implementation of the technique performed in a home network of the roaming user terminal comprises obtaining Service level-related Performance Data (SPD) that have been collected by the user terminal while roaming in a visited network. Additionally, subscription information associated with the user terminal and indicative of an SLA is obtained. Next, the SLA is validated based on a comparison of the SPD, or data derived therefrom, with the subscription information.

19 Claims, 13 Drawing Sheets

(51) Int. Cl.
*H04W 24/08* (2009.01)
*H04W 8/18* (2009.01)
*H04W 8/02* (2009.01)

(52) U.S. Cl.
CPC ............... *H04W 8/02* (2013.01); *H04W 8/18* (2013.01); *H04W 24/08* (2013.01); *H04L 41/5061* (2013.01); *H04M 2215/34* (2013.01)

(56) References Cited

U.S. PATENT DOCUMENTS

| | | |
|---|---|---|
| 2008/0049639 A1 | 2/2008 | Wiley et al. |
| 2012/0028603 A1* | 2/2012 | Gorman .................. H04L 12/14 455/408 |
| 2012/0034916 A1* | 2/2012 | Hu ......................... H04W 28/24 455/432.1 |
| 2012/0195223 A1 | 8/2012 | Raleigh |
| 2015/0092576 A1* | 4/2015 | Vaidya ..................... H04L 47/11 370/252 |
| 2015/0100426 A1 | 4/2015 | Hartzell et al. |
| 2017/0339584 A1* | 11/2017 | Ketonen ............. H04L 41/5009 |
| 2018/0206136 A1* | 7/2018 | Chow ................ H04L 43/0876 |
| 2019/0036630 A1* | 1/2019 | Svennebring ......... H04W 40/12 |

* cited by examiner

TECHNIQUE FOR HANDLING SERVICE LEVEL RELATED PERFORMANCE DATA FOR ROAMING USER TERMINALS

TECHNICAL FIELD

The present disclosure generally relates to communication networks. In particular, a technique for handling Service level related Performance Data (SPD) for user terminals roaming in visited networks is described. SPD handling includes various aspects, such as SPD collection, SPD reporting, SPD processing, and so on. The technique may be embodied in various aspects, such as apparatuses, systems, methods and computer programs.

BACKGROUND

The provision of wireless network services to user terminals typically requires a so-called subscription with an operator of the wireless network providing the services. The persons operating the user terminals and having such subscriptions are called subscribers.

Network operators conclude roaming agreements with each other to permit their subscribers to also access the wireless networks of the other operators. The operator that manages the subscription for a particular user terminal is called home operator, and the home operator's network is called home network. An operator that provides network services to a user terminal governed by a roaming agreement is called visited operator, and the visited operator's network is called visited network.

A user terminal is roaming when it is serviced in a visited network in which no subscription information for the user terminal is available. Before a roaming user terminal can access the services of the visited network, the required subscriber information must first be requested from the home network so that the subscriber can be properly authenticated, any authorization for using the services of the visited network can be checked, and the services can be charged to the subscriber.

Subscriptions often include so-called Service Level Agreements (SLAs) that grant particular data rates, data volumes or other preferred conditions to the associated subscriber. Customer care systems, on the other hand, collect various Key Performance Indicators (KPIs), service usage data, location data and other information to answer and promptly act on customer requests and complaints. The customer care systems thus permit SLA validation, for example by comparing the actual data rates provided to a subscriber's user terminal with a data rate guarantee as defined in the subscriber's SLA.

It has turned out that SLAs cannot be reliably verified in roaming scenarios and, as a result, it is not always possible to immediately take associated technical measures (such as data rate or data volume increases). This applies both to the scenario in which a user contacts a customer care system of a visited network while roaming and the scenario in which a user contacts a customer care system of the home network afterwards for problems that were encountered while roaming. The resulting drawback is believed to be become more pronounced in the future as roaming fees will decrease and, therefore, roaming will become increasingly popular in terms of the number of roaming users and the traffic volumes generated by roaming users.

SUMMARY

There is a need for a technique that solves one or more of the above problems, or other problems.

According to a first aspect, a method of validating an SLA for a user terminal is provided, wherein the method is performed in a home network of the user terminal. The method comprises obtaining SPD that have been collected by the user terminal while roaming in a visited network, obtaining subscription information associated with the user terminal and indicative of an SLA, and validating the SLA based on a comparison of the SPD, or data derived therefrom, with the subscription information.

The method may be performed by a customer care system within the home network of the user terminal. In one variant, the method is performed in a fully automated manner responsive to a triggering event.

The subscription information indicative of the SLA may, for example, be indicative of certain conditions granted to the associated subscriber for use with his or her user terminal. Such conditions may, for example, pertain to one or more of a particular data rate, a particular data volume, a particular service (e.g., voice or data service), a a particular network access technology (e.g., LTE or 5G), and so on. The subscription information may be obtained by accessing a subscriber database in the home network.

In the validating step, the SPD (e.g., a measured data rate or a measured data volume collected for the roaming user terminal) may directly be compared with the corresponding subscription information. Alternatively, the SPD may be processed further (e.g., in the home network) to derive data that can be compared with the subscription information.

In one variant, at least the validating step is performed responsive to a request message from a user of a user terminal. The request message may be received from the user terminal or via a communication channel different from the user terminal. Additionally, one or both of the SPD obtaining step and the subscription information obtaining step may likewise be performed responsive to that request message.

The method may further comprise sending a notification message to a user of the user terminal if an SLA violation is identified upon validating the SLA. The notification message may be directly sent to the user terminal or via another communication channel.

The method may further comprise receiving, from the visited network and for the user terminal, a report pertaining to at least one of charging data and performance data. In such a case, the SPD collected by the user terminal may be validated based on the performance data, or vice versa. Additionally, or in the alternative, the charging data in the report may be validated based on the collected SPD, or vice versa. It will be appreciated that one or more of the SPD, the performance data and the charging data may be processed further to derive data suitable for the validation process.

The SLA may be excluded from validation dependent on a result of the SPD validation. If, for example, there is discrepancy between the collected SPD and the reported performance data, the SLA may be excluded from validation. Additionally, or in the alternative, a notification message may be sent to an operator of the visited network dependent on a result of the charging data validation. If, for example, there is no discrepancy between the collected SPD and the reported performance data and if additionally the SLA validation indicates that the SLA has been violated for the roaming user terminal, the operator of the visited network may be notified thereof. The notification message sent to the operator of the visited network may comprise the collected SPD or data derived therefrom. As such, the operator of the visited network may perform a local validation of the collected SPD (e.g., based on the performance data collected in the visited network for the user terminal).

The method may also comprise repeatedly validating a respective SLA for multiple user terminals that have been roaming in the visited network to derive SLA violation data. The SLA violation data may, for example, be indicative of a number or percentage of SLA violations. Based on the SLA violation data, a roaming SLA for the visited network may be validated. Moreover, a verification message may be sent to an operator of the visited network if a roaming SLA violation is identified upon validating the roaming SLA. A roaming SLA violation may, for example, be identified by comparing the SLA violation data with a predefined violation threshold.

Obtaining the SPD may comprise receiving the SPD from the user terminal. As an example, the user terminal may be triggered to transmit the SPD upon attachment of the user terminal to the home network. Alternatively, the user terminal could also be configured to automatically transmit the SPD (e.g., upon its return to the home network).

In an alternative variant, obtaining the SPD may comprise receiving the SPD from a Network Management System (NMS). The NMS may centrally collect the SPD for a plurality of the user terminals. As such, the user terminals may transmit the respectively collected SPD to the NMS. The NMS, in turn, may be queried by a customer care system or any other application for the SPD collected by a particular user terminal for the purposes of SLA validation.

In one implementation, the SPD pertain to at least one of circuit-switched services and voice services provided in the visited network. Such circuit-switched services and voice services may be handled by the access and core network nodes of the visited network. The associated SPD may be, in one variant, be obtained in the visited network by probing corresponding user plane traffic at a gateway node of the core network. However, there may be no possibility to efficiently collect the associated SPD within the home network.

The method may further comprise downloading an SPD collection application to the user terminal. The SPD collection application may be configured to collect the SPD. Moreover, the SPD collection application may also be configured to report the collected SPD so that the customer care system or any other application can obtain the corresponding SPD for SLA validation purposes.

According to a second aspect, a method of obtaining SPD collected by a user terminal while roaming is presented, wherein the method is performed in a network visited by the user terminal. The method comprises obtaining SPD collected by the roaming user terminal for packet-switched services provided to the user terminal while roaming in the visited network. The method further comprises analysing the SPD.

For example, the SPD may be analysed in the context of an SLA validation. The SLA may be a roaming SLA of an operator of the visited network with an operator of a home network of the roaming user terminal or an SLA between an operator of the home network and a subscriber operating the roaming user terminal. Alternatively, or in addition, the SPD may be analysed in the context of a customer care validation.

The analysing step may be performed responsive to a notification received from a home network of the roaming user terminal (e.g., in case of SLA validation) or responsive to a notification received from the user terminal or a user thereof (e.g., in case of customer care validation). As an example, analysing the SPD may comprise verifying an SLA violation reported in the notification from the home network. To this end, the SPD obtained for the roaming user terminal in the visited network, or information derived therefrom, may be compared with SLA violation information received in the notification from the home network of the roaming user terminal to determine whether the SLA violation can be verified or not.

The user plane traffic associated with the packet-switched services may be handled by a gateway node of a home network of the roaming user terminal. While the associated SPD may thus be obtained at the home network, they may not be available in the visited network.

The method may be performed by a customer care system within the visited network. In one variant, the method is performed in a fully automated manner responsive to a triggering event.

The method performed in the visited network may further comprise obtaining SPD collected by at least one non-roaming user terminal for packet-switched services in the network. The network may thus be the home network for the at least one non-roaming user terminal. In such a case, analysing the SPD collected by the at least one roaming user terminal may comprise determining a deviation relative to the SPD collected by the at least one non-roaming user terminal. It may thus, for example, be determined if roaming and non-roaming user terminals experience a comparable network performance, or if roaming user terminals are treated differently than non-roaming user terminals in the network.

The method performed in the visited network may further comprise downloading an SPD collection application to the roaming user terminal. The SPD collection application may be configured to collect the SPD. In one variant, the SPD collection application is downloaded to the roaming user terminal upon initially attaching to the visited network.

According to a third aspect, a method of reporting SPD collected for a user terminal while roaming is presented. The method is performed by the user terminal and comprises detecting a data collection start condition and starting, in response to detecting the data collection start condition, collection of SPD for services provided in a visited network to the roaming user terminal. The method further comprises detecting a data reporting condition and reporting, in response to detecting the data reporting condition, the collected SPD.

The data collection start condition may be an attachment of the user terminal to the visited network. Alternatively, or in addition, the data collection start condition may be receipt of a data collection start command from the visited network.

The method performed by the user terminal may further comprise detecting a data collection stop condition and stopping, in response to detecting data collection stop condition, collection of the SPD for services provided in the visited network to the roaming user terminal. The data collection stop condition may be at least one of receipt of a data reporting command from the visited network, a detachment of the user terminal from the visited network, expiry of a data reporting interval, and receipt of a data collection stop command from the visited network.

In one variant, the data reporting condition is an attachment of the user terminal to the home network. Additionally, or in the alternative, the data reporting condition is receipt of a data reporting command.

The SPD may be collected for at least one of circuit-switched services and voice services provided in the visited network. Of course, the SPD may be collected also for other services provided in the visited network, such as packet-switched services.

The collected SPD may be reported to or via a home network of the user terminal. For example, the collected SPD may be reported to an NMS, possibly via the home network. The collected SPD may additionally, or in the alternative, be reported to or via the visited network. As an example, the collected SPD may be reported via the visited network to a trusted entity. The trusted entity may be an entity accessible by both the visited network and the home network. The home network may obtain the collected SPD from the trusted entity.

The method performed by the user terminal may further comprise collecting supplemental data in association with the SPD. The supplemental data may comprise at least one of position data for the roaming user terminal, user identification data, a timestamp and radio environment data. In one implementation, the one or more items of supplemental data are collected at substantially the same time as one or more items of SPD. The one or more supplemental data items and the one or more SPD items may be collected in a data record. One or more of such data records may then be reported by the user terminal in response to detecting the data reporting condition.

The SPD may relate to at least one of a parameter related to a QoE, a parameter related system-related performance, a parameter related to media data processing by the user terminal, a parameter related to call setup by the user terminal, and a parameter related to a signal quality experienced by the user terminal. As an example, the SPD may comprise information indicative of at least one of unsuccessful call attempts, abnormal call releases, type of radio access technology, Quality of Service Class Identifier (QCI), Reference Symbol Received Power (RSRP), Reference Symbol Received Quality (RSRQ), Received Signal Code Power (RSCP), media Mean Opinion Score (MOS), media buffering ratio, media stall time ratio, media start time, web page access time, web page access success rate, call setup time, and call duration. In certain variants, the SPD may relate to KPIs (including any of the parameters presented above).

The SPD collected by the user terminal while roaming may in particular relate to one or more parameters that cannot (or only with significant technical effort) be collected within the home network (in the first aspect described above) or in the visited network (in the second aspect described above). Moreover, one or both of the home network and the visited network may be configured to correlate SPD collected by the roaming user terminal with SPD collected by the respective network (e.g., in connection with the SLA validating or the SPD analysing step, respectively). To this end, the SPD collected by the roaming user terminal may be suitably classified for being correlated with similarly classified SPD collected within one or both of the home network and the visited network.

Also provided is a computer program product comprising program code portions to perform the steps of any of the methods and method aspects presented herein when the computer program product is executed on one or more processing devices. The computer program product may be stored on one or more computer-readable recording media, such as semiconductor memories, CD-ROMS, DVDs, and so on. The computer program product may in one example be distributed among various components of a virtualized network node. In another example, the computer program product may reside in a user terminal.

According to a still further aspect, an apparatus configured to validate an SLA for a user terminal is provided. The apparatus is located in a home network of the user terminal and is configured to obtain SPD that have been collected by the user terminal while roaming in a visited network, and to obtain subscription information associated with the user terminal and indicative of an SLA. Still further, the user terminal is configured to validate the SLA based on a comparison of the SPD, or data derived therefrom, with the subscription information.

The apparatus located in the home network may further be configured to perform the steps of the method according to the first aspect, or other steps.

Also provided is an apparatus configured to obtain SPD collected by a user terminal while roaming, wherein the apparatus is located in a network visited by the user terminal. The apparatus is configured to obtain SPD collected by the roaming user terminal for packet-switched services provided to the user terminal while roaming in the visited network, and to analyse the SPD in the context of at least one of customer care and SLA validations.

The apparatus located in the visited network may be configured to perform the steps of the method according to the second aspect, or other steps.

Still further, a user terminal configured to report SPD collected by the user terminal while roaming is provided. The user terminal is configured to detect a data collection start condition and to start, in response to detecting the data collection start position, collection of SPD for services provided in a visited network to the roaming user terminal. The user terminal is further configured to detect a data reporting condition and to report, in response to detecting the data reporting condition, the collected SPD.

The user terminal may further be configured to perform the steps of the method according to the third aspect, or other steps.

Also provided is a network system comprising the apparatus located in the visited network and the user terminal as presented herein. A still further network system comprises the apparatus located in the home network and the user terminal presented herein.

BRIEF DESCRIPTION OF THE DRAWINGS

Further details of embodiments of the technique are described with reference to the enclosed drawings, wherein.

DETAILED DESCRIPTION

Figure 1:
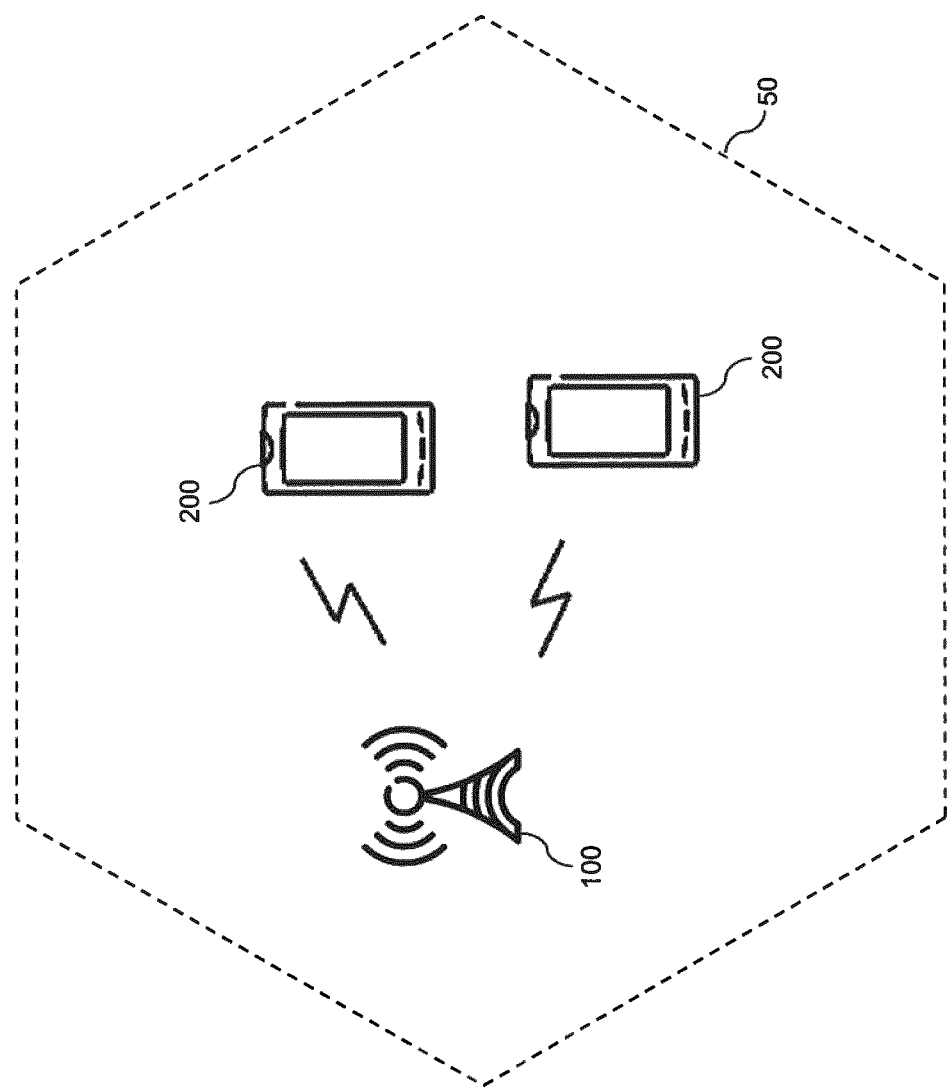
FIG. 1 shows a schematic diagram of a communication system embodiment.

In the following description, for purposes of explanation and not limitation, specific details are set forth, such as specific wireless communication systems and network environments, in order to provide a thorough understanding of the technique disclosed herein. It will be apparent to one skilled in the art that the technique may be practiced in other embodiments that depart from these specific details. Any two or more embodiments described herein can be combined in any way with each other.

Moreover, those skilled in the art will appreciate that the services, functions, steps and units explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the present disclosure may also be embodied in a computer program product as well as in a system comprising a computer processor and memory coupled to the processor, wherein the memory is encoded with one or more programs that may perform the services, functions, steps and implement the units disclosed herein when executed on the processor herein.

In some embodiments, the non-limiting term user terminal is used. The user terminal can be any type of wireless device capable of communicating with a network node or another user terminal over radio signals. The user terminal may also be any radio communication device, tablet, smart phone, laptop-embedded equipment (LEE), laptop-mounted equipment (LME), USB dongle, Customer Premises Equipment (CPE), and so on.

In some embodiments, the generic terminology "network node" is used. This terminology denotes any kind of network node which may comprise a radio or access network node such as a base station, radio base station, base transceiver station, base station controller, network controller, evolved Node B (eNodeB or eNB), Node B, Multi-cell/multicast Coordination Entity (MCE), relay node, access point, radio access point, Remote Radio Unit (RRU), Remote Radio Head (RRH). It may also comprise a core network node (e.g., Mobility Management Entity or MME, Self-Organizing Network (SON) node, a coordinating node, positioning node, Maintenance and Drive Test (MDT) node, etc.), customer care system node, or an external node.

The embodiments are applicable to single carrier as well as to multicarrier or Carrier Aggregation (CA) operation of the user terminal in which the user terminal device is able to receive and/or transmit data to more than one serving cells. CA is also called (e.g., interchangeably) "multi-carrier system", "multi-cell operation", "multi-carrier operation", "multi-carrier" transmission and/or reception. In CA, one of the Component Carriers (CCs) is the Primary Component Carrier (PCC) or simply primary carrier or anchor carrier. The remaining ones are called Secondary Component Carriers (SCCs) or simply secondary carriers or supplementary carriers. The serving cell is interchangeably called Primary Cell (PCell) or Primary Serving Cell (PSC). Similarly, the secondary serving cell is interchangeably called Secondary Cell (SCell) or Secondary Serving Cell (SSC).

FIG. 1 illustrates an embodiment of a wireless communication system comprising a network node 100 (e.g., a node of an access or radio network, such as a base station) as well as multiple user terminals 200 served by the network node 100. The user terminals 200 are sometimes also denoted User Equipments (UEs). The network node 100 provides one or more cells 50 in which the user terminals 200 served by the network node 100 are located. The network node 100 and the wireless devices 200 may be compliant with the LTE specifications or 5G concepts. In the LTE vocabulary, the network node 100 is also denoted eNodeB.

It will be appreciated that the communication system embodiment illustrated in FIG. 1 will comprise additional network components not illustrated therein. Such additional network components include, for example, core network components, Internet servers, and so on. It will further be appreciated that—from the perspective of the network comprising network node 100 and the additional network components—each user terminal 200 can either have a roaming or non-roaming status. As explained above, a user terminal 200 will have a roaming status if the network acts as a visited network for the user terminal 200 and a non-roaming status if the network acts as a home network.

Figure 2:
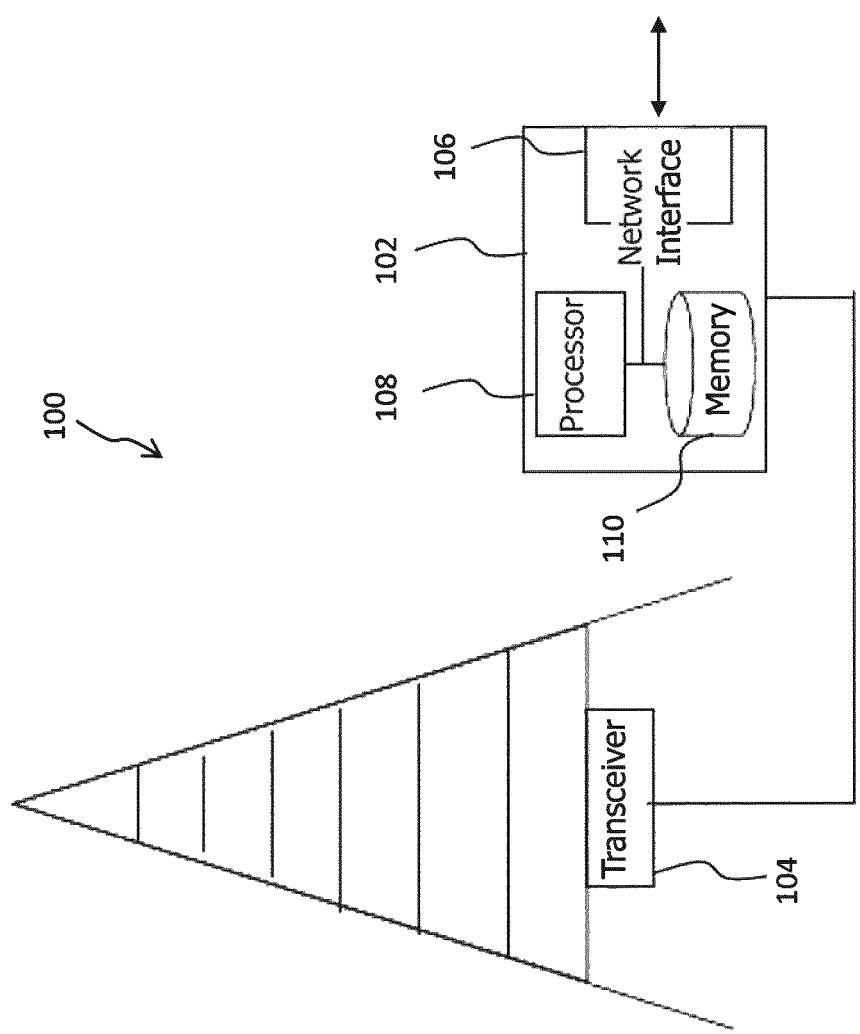
FIG. 2 shows a schematic block diagram of a network node embodiment.

FIG. 2 illustrates a block diagram of an embodiment of the network node 100. As illustrated in FIG. 2, the network node 100 comprises a network apparatus 102 and a transceiver 104 coupled to the network apparatus 102. The network apparatus 102 in the present embodiment comprises a network interface 106 (e.g., towards a core network and/or backhaul network), at least one processor 108 as well as at least one memory 110. The memory 110 is configured to store program code that, when executed by the at least one processor 108, controls the network node 100 to perform the steps, functions and services discussed herein.

It will be appreciated that the network node 100 could also be realized in a distributed manner using cloud computing resources. In such a case the network apparatus 102 will be a virtualized network entity. It will further be appreciated that the network apparatus 102 could also be located in any network node or network component that does not have a network access function.

Figure 3:
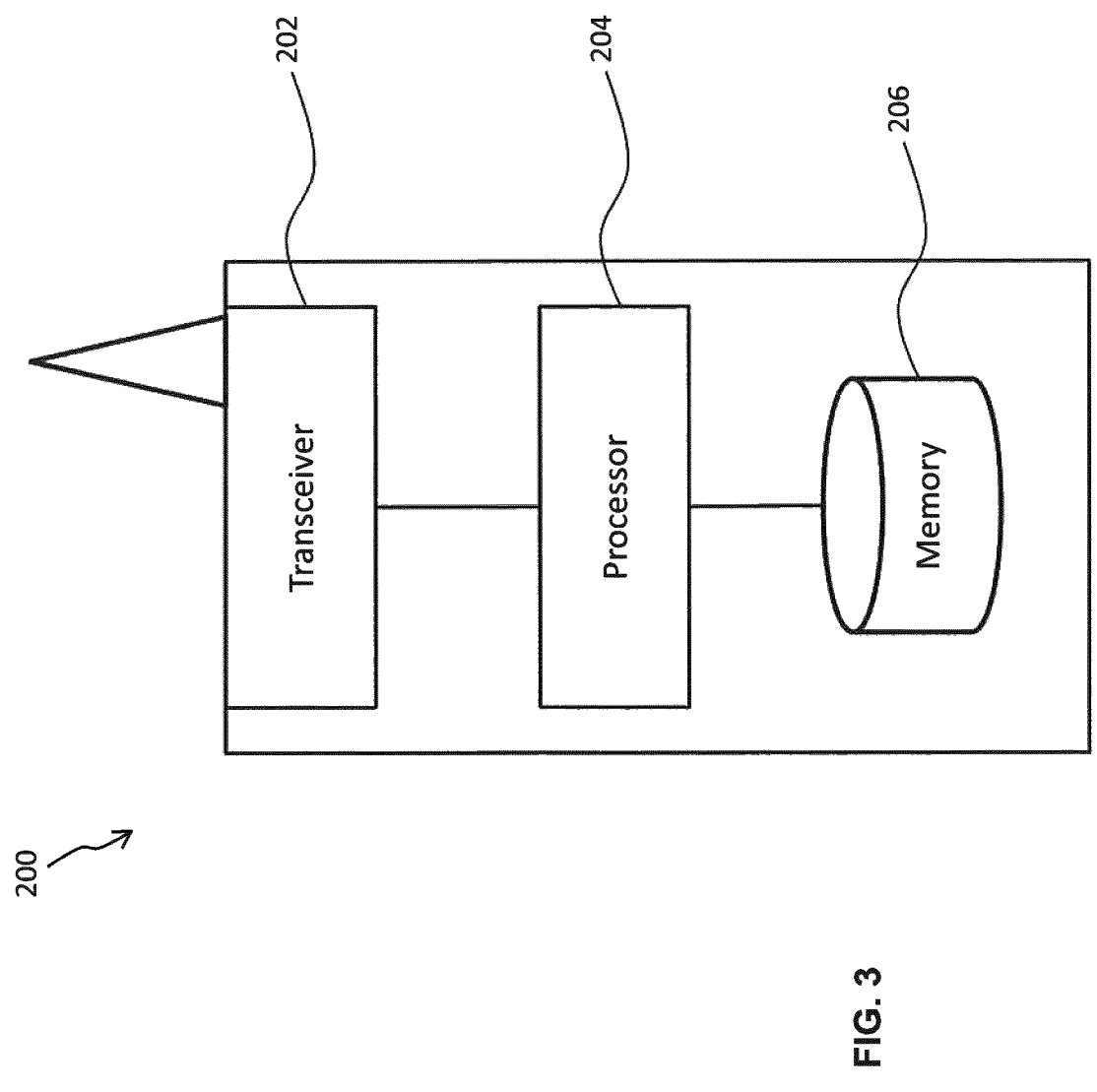
FIG. 3 shows a schematic block diagram of a user terminal embodiment.

FIG. 3 illustrates an embodiment of a user terminal 200. The user terminal 200 illustrated in FIG. 3 comprises a transceiver 202, at least one processor 204 and at least one memory 206. The memory 206 is configured to store program code that, when executed by the at least one processor 204, controls the user terminal 200 to perform the functions and steps presented herein.

In the following, functional embodiments of the network apparatus 102 and the user terminal 200 will be explained in greater detail with reference to FIGS. 4 to 6. These functional embodiments may be implemented in the context of the structural embodiments of the network node 100 and the wireless device 200 as illustrated in FIGS. 2 and 3, respectively, or otherwise.

The functional embodiments target at handling SPD data for user terminals 200 that are or have been roaming. As will be explained below, the user terminals 200 are configured to collect SPD for services provided to the user terminals 200 when roaming in a visited network. Moreover, a home network of a user terminal 200 is configured to process the SPD collected by the user terminal 200 when roaming for validating an SLA for the user terminal 200. The visited network of a user terminal 200 is configured to analyze the SPD collected by the roaming user terminal 200.

Figure 4:
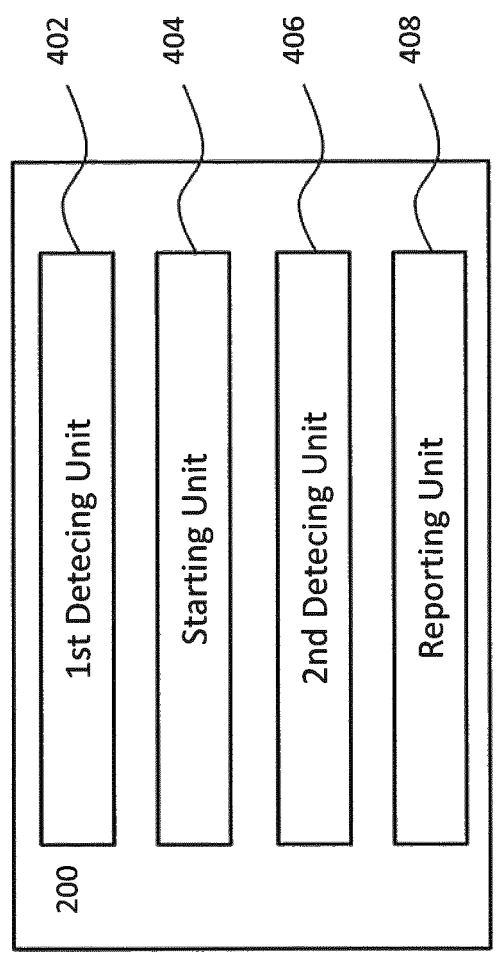
FIG. 4 is a schematic block diagram of a further user terminal embodiment.

As illustrated in FIG. 4, the user terminal 200 in one functional embodiment comprises a first detecting unit 402 configured to detect a data collection start condition. A starting unit 404 of the user terminal 200 is configured to start, in response to detecting the data collection start condition, collection of SPD for services provided in a visited network to the roaming user terminal 200. A second detecting unit 406 is configured to detect a data reporting condition. The data reporting condition may be detected while still roaming in the visited network or after having returned to the home network. Moreover, a reporting unit 408 is configured to report, in response to detecting the data reporting condition, the collected SPD.

The individual units 402 to 408 may take the form of software modules stored in the memory 206 of the user terminal 200. Alternatively, the units 402 to 408 could also (e.g., at least partially) be realized as hardware components.

Figure 5:
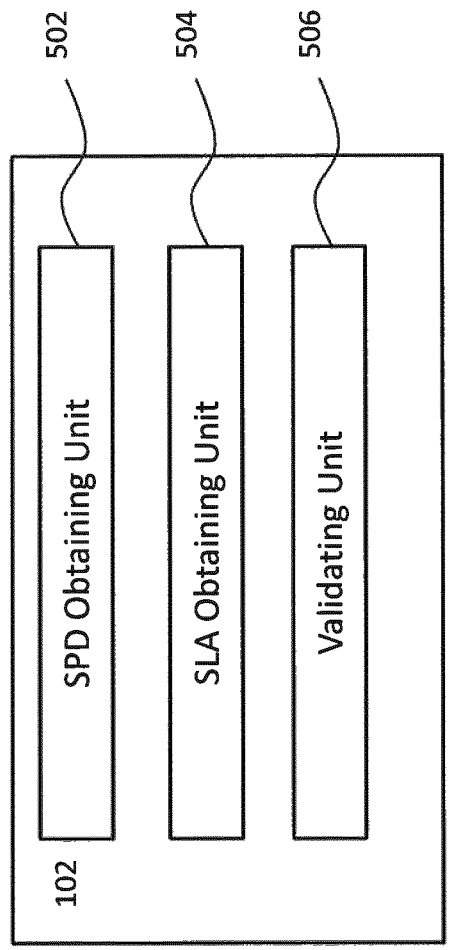
FIG. 5 is a schematic block diagram of a network apparatus embodiment.

As illustrated in FIG. 5, the network apparatus 102 of a home network of a user terminal 200 in one functional embodiment comprises an SPD obtaining unit 502 configured to obtain SPD that have been collected by the user terminal 200 while roaming in a visited network. An SLA obtaining unit 504 is configured to obtain subscription information associated with the user terminal 200 and indicative of an SLA. Moreover, a validating unit 506 is configured to validate the SLA based on a comparison of the SPD, or data derived therefrom, with the subscription information.

The individual units 502 to 506 may take the form of software modules stored in the memory 110 of the network apparatus 102. Alternatively, the units 502 to 506 could also (e.g., at least partially) be realized as hardware components. It will be appreciated that the network apparatus 102 need not necessarily be located in an access network node 100 as shown in FIG. 1. Rather, the network apparatus 102 could alternatively be located in a core network and/or in a customer care system. Moreover, the network apparatus 102 could also be implemented in a distributed manner.

Figure 6:
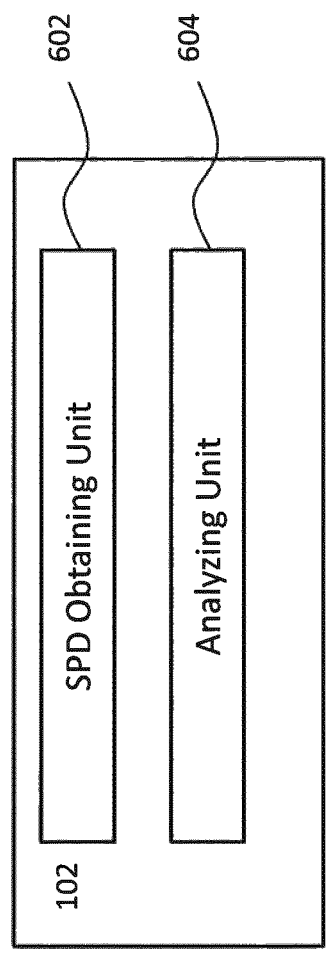
FIG. 6 is a schematic block diagram of a further network apparatus embodiment.

As illustrated in FIG. 6, the network apparatus 102 in a network visited by a user terminal 200 in one functional embodiment comprises an SPD obtaining unit 602 configured to obtain SPD collected by the roaming user terminal 200 for packet-switched services provided to the user terminal 200 while roaming in the visited network. Moreover, an analyzing unit 604 is configured to analyze the SPD in the context of at least one of customer care and SLA validations.

The individual units 602 and 604 may take the form of software modules stored in the memory 110 of the network apparatus 102. Alternatively, the units 602 and 604 could also (e.g., at least partially) be realized as hardware components. It will be appreciated that the network apparatus 102 need not necessarily be located in an access network node 100 as shown in FIG. 1. Rather, the network apparatus 102 could alternatively be located in a core network and/or in a customer care system. Moreover, the network apparatus 102 could also be implemented in a distributed manner.

Figure 7:
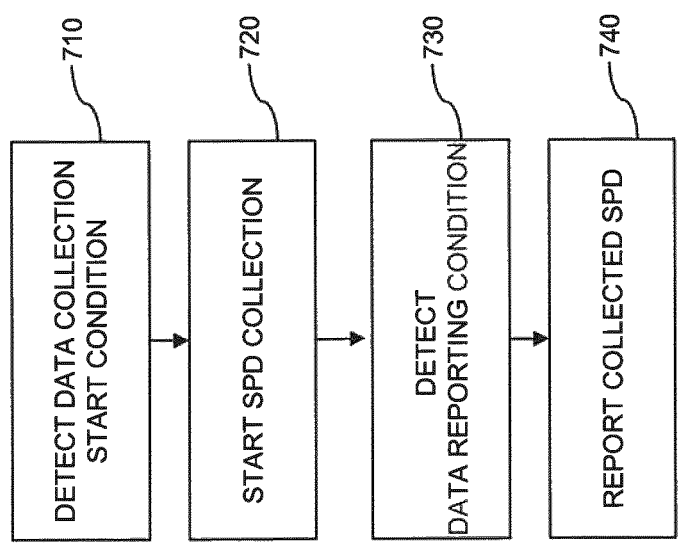
FIG. 7 shows a flow diagram of a first method embodiment.

FIG. 7 illustrates a flow diagram 700 of a method embodiment that can be performed by the user terminal 200 as discussed with reference to FIGS. 1, 3 and 4. The method illustrated in FIG. 7 may be performed by the user terminal 200 under control of an SPD collection application downloaded to the user terminal 200. The SPD collection application could have been downloaded to the user terminal 200 by its home network or, alternatively, by the visited network. The method illustrated in FIG. 7 may be performed in the visited network or partially in the visited network and partially in the home network.

In step 710, the user terminal 200 detects a data collection start condition. The data collection start condition detected in step 710 could be an attachment of the user terminal 200 to the visited network. As an alternative, the data collection start condition could be receipt of a data collection start command from the visited network.

In response to detecting the data collection start condition in step 710, the user terminal 200 starts SPD collection in step 720. Specifically, the user terminal 200 collects SPD for services provided in the visited network. Such services include one or more of circuit-switched services, voice services and packet-switched services.

In step 730, the user terminal 200 detects a data reporting condition. In one variant, the data reporting condition is an attachment of the user terminal 200 to the home network. Alternatively, the data reporting condition is receipt of a data reporting command (e.g., while still roaming in the visited network or after having returned to the home network).

In response to detecting the data reporting condition in step 730, the user terminal 200 reports the collected SPD in step 740. The collected SPD may be reported to or via the home network (in particular for SPD collected in connection with circuit-switched services and/or voice services provided in the visited network). The collected SPD may also be reported to or via the visited network (in particular for SPD collected in connection with packet-switched services provided in the visited network). As an example, the collected SPD may be reported via the visited network to a trusted entity and/or to an NMS.

While not illustrated in FIG. 7, the user terminal 200 may additionally detect a data collection stop condition. The data collection stop condition may be detected prior to detecting the data reporting condition in step 730. In an alternative scenario, the data reporting condition in step 730 constitutes the data collection stop condition, or vice versa. In other cases, the data collection stop condition could be a detachment of the user terminal 200 from the visited network, expiry of a data reporting interval (that may, for example, have started upon starting the SPD collection in step 720), or receipt of a data collection stop command from the visited network.

Figure 8:
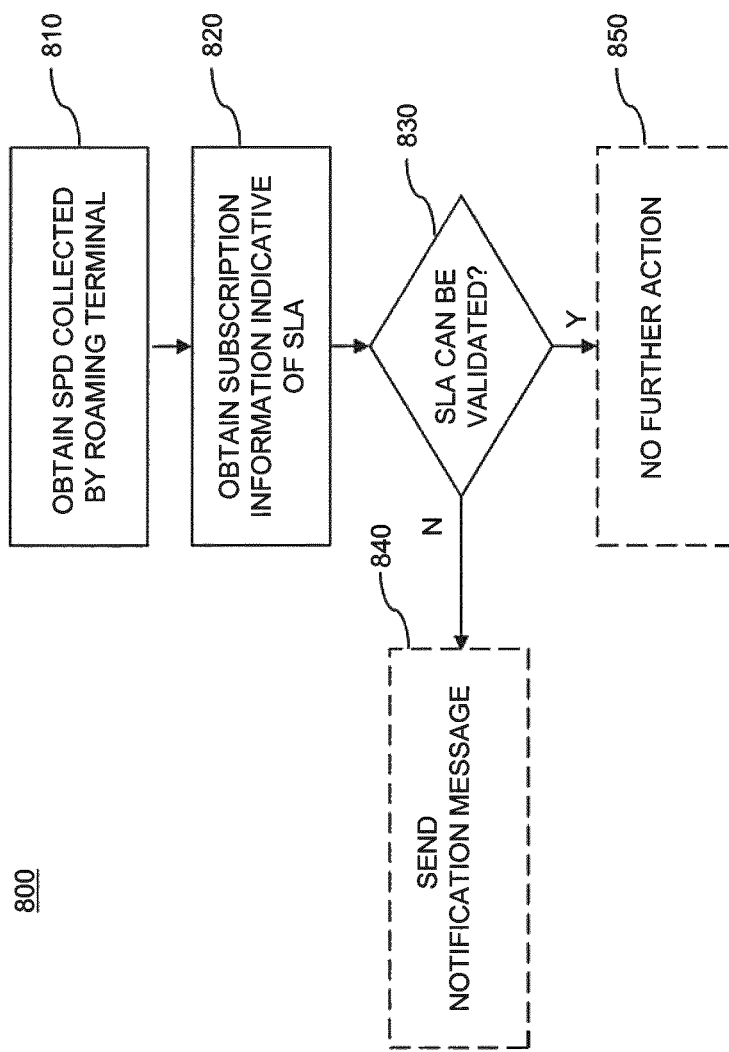
FIG. 8 shows a flow diagram of a second method embodiment.

FIG. 8 illustrates a flow diagram 800 of a method embodiment that may be performed by the network apparatus 102 as discussed with reference to FIGS. 1, 2 and 5, or another network apparatus. The network apparatus 102 performing the method embodiment belongs to a home network of a user terminal 200 that has collected SPD while roaming in a visited network (e.g., as explained above with reference to FIG. 7).

In step 810, the network apparatus 102 obtains SPD collected by the user terminal 200 while roaming in a visited network. The SPD may be obtained directly from the user terminal 200 (e.g., in response to a data reporting command sent by the network apparatus 102) or, alternatively, from an NMS or any trusted entity.

The collected SPD pertain in particular to circuit-switched services or voice services provided to the user terminal 200 in the visited network. Data pertaining to such circuit-switched services and voice services of a roaming user terminal are handled by the access and core network nodes of the visited network. The associated SPD can thus be obtained by probing the corresponding user plane traffic at a gateway node of the core network within the visited network. Since the access and core network nodes of the home network do typically not handle the voice/circuit-switched user plane traffic for its own user terminals 200 when roaming, the associated SPD can thus typically not be collected within the home network (although the associated control plane traffic for the roaming user terminal 200 may run across the home network). On the other hand, while it might be possible within the visited network to collect SPD for roaming user terminals 200, the corresponding control plane traffic may not be visible within the visited network, so that the visited network cannot identify the subscription or other pertinent data for a roaming user terminal 200 needed for properly analyzing the SPD (e.g., for SLA or roaming SLA validation).

In a further step 820, the network apparatus 102 obtains subscription information associated with the user terminal 200 and indicative of an SLA. The subscription information may be obtained by accessing a local subscription database in the home network. The subscription information indicate preferred conditions granted to a user of the user terminal 200, such as a preferred data rate, a preferred data volume or a preferred network access technology (such as LTE or 5G).

In a further step 830 it is determined if the SLA can be validated based on a comparison of the SPD obtained in step 810 (or data derived therefrom) and the subscription information obtained in step 820. In this regard, an SLA violation may be determined if a certain deviation of the SPD, or the data derived therefrom, from the subscription information can be determined. As an example, the deviation of an (e.g., average) data rate provided while roaming in the visited network may be compared with a guaranteed data rate defined in the subscription information. If the deviation exceeds a predefined threshold, an SLA violation may be identified.

If the SLA cannot be validated because of an SLA violation, the method proceeds to an optional step 840 in which a notification message is sent. A notification message may be sent to one or both of a user of the user terminal 200 (e.g., directly to the user terminal 200) and to an operator of the visited network. When sent to the user of the user terminal 200, the notification message may include information that the services provided in the visited network will not be charged or will be charged at a preferred rate. If the notification message is sent to the operator of the visited network, it may include an indication of the SLA violation to permit the operator of the visited network to take an appropriate action. As an example, the notification message may communicate to the operator of the visited network that the (e.g., average) data rate in the visited network deviated from a certain data rate guarantee. If, on the other hand, the SLA can successfully be validated in step 830, in one optional implementation no further action is taken (see step 850).

Figure 9:
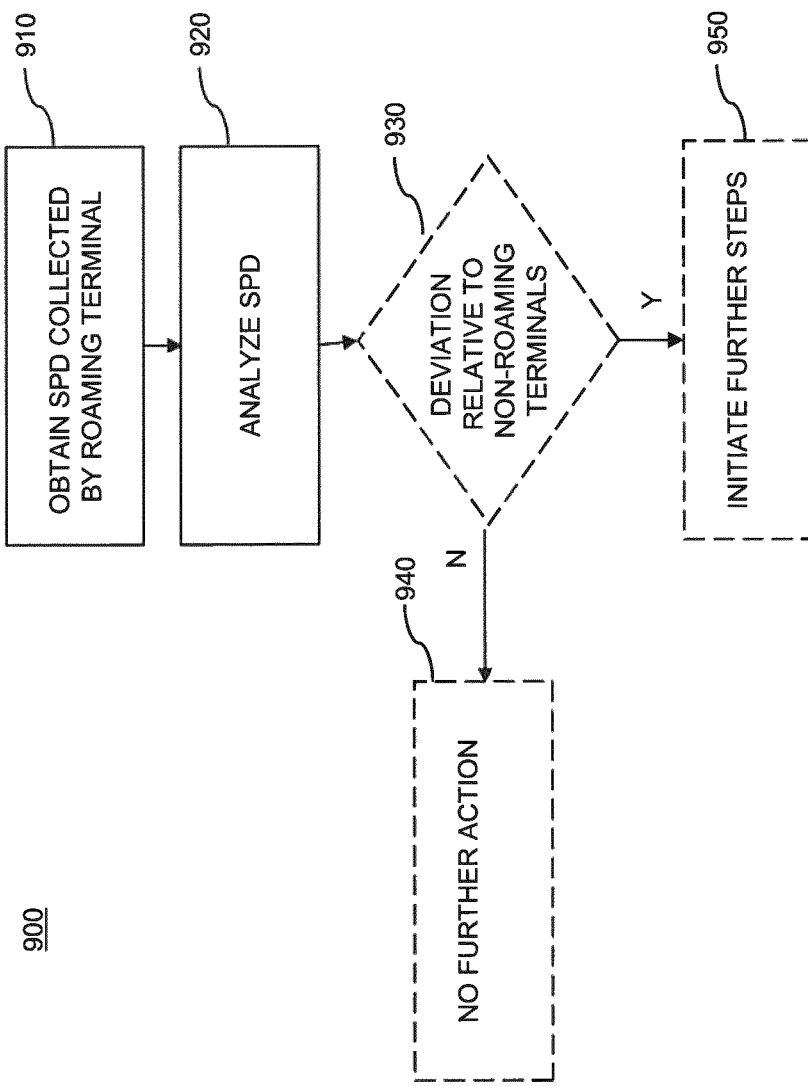
FIG. 9 shows a flow diagram of a third method embodiment.

FIG. 9 illustrates a flow diagram 900 of a method embodiment that may be performed by the network apparatus 102 as discussed with reference to FIGS. 1, 2 and 6, or another network apparatus. The network apparatus 102 performing the method embodiment belongs to a visited network of a user terminal 200 that has collected SPD while roaming in the visited network (e.g., as explained above with reference to FIG. 7).

In step 910 the network apparatus 102 obtains the SPD collected by the roaming user terminal 200 for packet-switched services provided to the user terminal 200 while roaming in the visited network. The SPD may be obtained directly from the user terminal 200 (e.g., in response to a data reporting command sent from the visited network to the user terminal 200).

As opposed to circuit-switched and voice data, the data underlying packet-switched services of a roaming user terminal 200 will be handled by a gateway node within the home network of the roaming user terminal 200. The home network can also identify the subscription associated with the roaming user terminal 200. As such, various types of SPD cannot be collected by the visited network for packet-switched services provided in the visited network to a roaming user terminal 200. Since, on the other hand, the access network nodes of the visited network will service roaming user terminals 200, access-related SPD (e.g., radio-related SPD) can be obtained for roaming user terminals 200 in the visited network and evaluated (e.g., for SLA or roaming SLA validation).

In a further step 920, the SPD obtained in step 910 is analyzed in the context of at least one of customer care and SLA validations. The corresponding analysis may, for example, be performed to determine a service quality deviation between roaming and non-roaming user terminals 200 in regard of packet-switched services. To this end, SPD collected by one or more non-roaming user terminals 200 for packet-switched services in the network may be compared to the SPD obtained for one or more roaming user terminals 200 in step 910.

In case no deviation is determined in an optional further step 930, no further action is taken (see step 940). If, on the other hand, such a deviation can be determined in step 930, one or more further steps 950 may be initiated. As an example, charging records for roaming user terminals 200 may be adjusted or notification messages may be sent to the operators of their home networks.

As has become apparent from the above embodiments, and as will be described in more detail with reference to further embodiments below, the technique presented herein permits improved customer care support in roaming scenarios based on the SPD collected by roaming user terminals 200. Operators can easily check if a particular SLA is fulfilled based on the collected SPD. Moreover, the visiting network can easily control service performance and answer notifications from home networks for roaming user terminals 200, in particular for packet-switched services provided in the visited network. In the visited network the same customer care services can be provided for roaming user terminals 200 as for non-roaming user terminals 200 based on the collected SPD. The SPD thus obtained permit customer care data analytics systems to derive service quality parameters (e.g., service-level or network resource-level KPIs) and to perform root cause investigations in case of service problems. As an example, it may be identified if the root cause is on the side of the network or on the side of the terminal, related to a particular subscription or caused by coverage problems, and so on. In this way, network operators are able to properly answer customer care complaints also for roaming scenarios.

Additionally, the SPD collected from multiple user terminals 200 can be used to validate roaming SLAs between different network operators. To this end, the collected SPD may be compared with charging and performance reports received from other operators for roaming user terminals.

Figure 10:
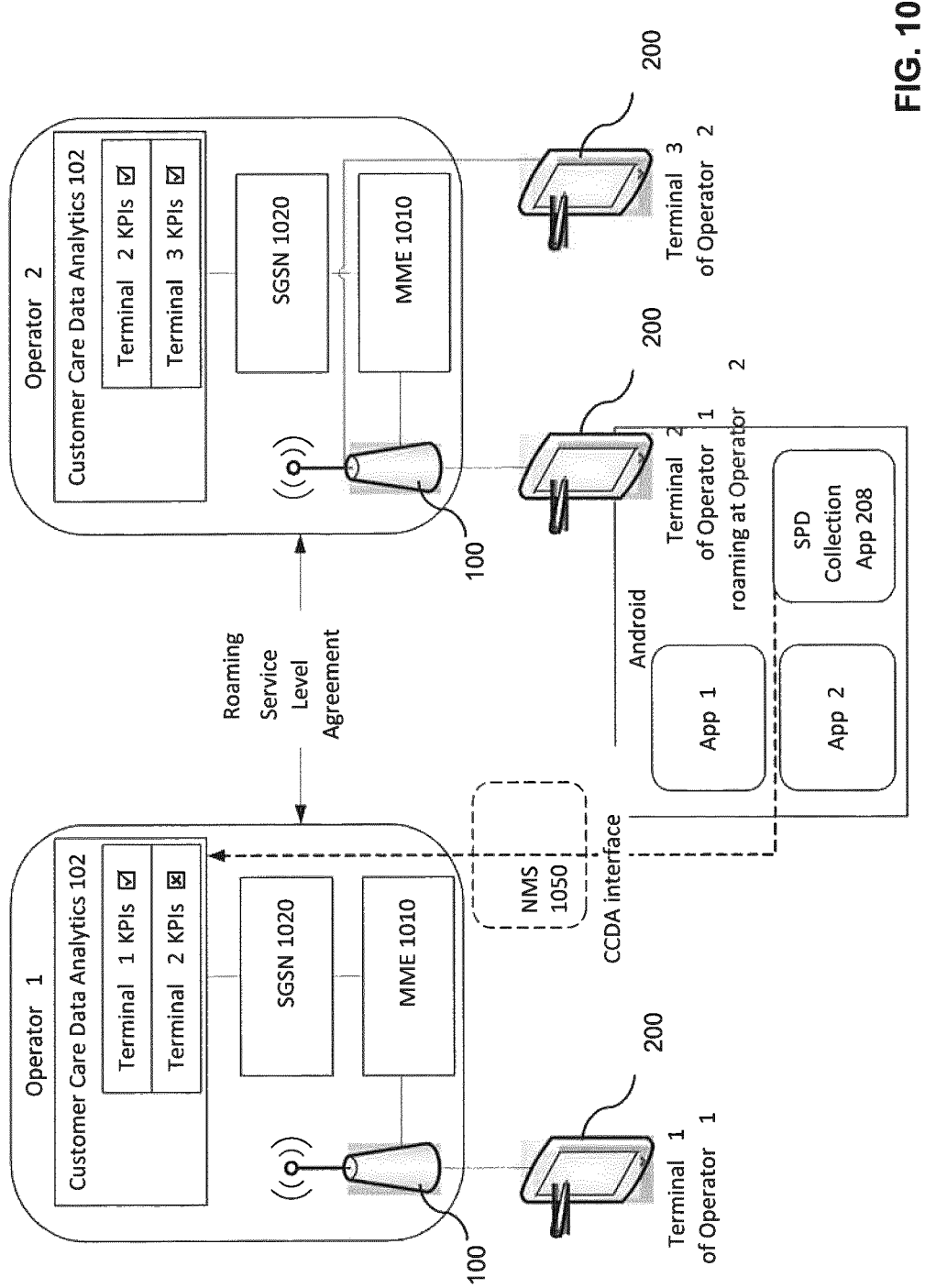
FIG. 10 shows a schematic block diagram of a further communication system embodiment.

The embodiments described above with reference to FIGS. 1 to 9 may in particular be implemented in the context of the further communication system embodiment illustrated in FIG. 10. FIG. 10 shows a portion of the respective network infrastructure of two network operators (denoted as Operator 1 and Operator 2, respectively). Each of the network infrastructures shown in FIG. 10 comprises one or more access network nodes 100, an MME 110, a Serving GPRS Support Node (SGSN) 1020 as well as a Customer Care Data Analytics (CCDA) apparatus 102. The CCDA apparatus 102 may be configured and may operate as explained above in connection with the network apparatus 102.

As also illustrated in FIG. 10 there exists a roaming SLA between the two operators. The roaming SLA defines preferred conditions that may be granted to roaming user terminals 200 in the respective visited network.

Also illustrated in FIG. 10 are three user terminals 200 identified as Terminal 1, Terminal 2 and Terminal 3, respectively. Terminal 1 and Terminal 3 are non-roaming user terminals 200 within their corresponding home networks (of Operator 1 and Operator 2, respectively). Terminal 2, on the other hand, has a subscription with Operator 1 and is roaming in the (visited) network of Operator 2.

Terminal 2 has an Android-based operating system and is configured to run individual applications (denoted as "Apps" in FIG. 10). One of these applications is a so-called SPD Collection App 208. The SPD Collection App 208 is stored in the memory 206 of the user terminal 200 and is configured to be executed by the corresponding processor 204 (see FIG. 3). As also shown in FIG. 10, the SPD Collection App 208 has an interface to the CCDA apparatus 102 of the home operator or to an NMS 1050. This CCDA interface permits the reporting of SPD to the CCDA apparatus 102 (either directly or via an optional NMS 1050). Additionally, or in the alternative, such a CCDA interface could also be provided towards the CCDA apparatus 102 of the visited network (see FIG. 12).

The SPD Collection App 208 may be configured to operate as explained above with reference to FIGS. 4 and 7. In a similar manner, the CCDA apparatus 102 of the home network and the visited network may be operated as explained above with reference to FIGS. 5 and 8 as well as FIGS. 6 and 9, respectively.

In the following, exemplary modes of operation of the SPD Collection App 208 on the one hand and the CCDA apparatus 102 in the home network of Terminal 2 on the other will be described with reference to the flow diagram 1100 of a further method embodiment illustrated in FIG. 11. The method embodiment may in particular be performed in connection with the apparatus embodiments depicted in FIGS. 5 and 8.

In step 1110 the home network deploys (e.g., downloads) the SPD Collection App 208 to the user terminals 200 of its own subscribers, such as Terminal 2. As an example, the SPD Collection App 208 may selectively be deployed to user terminals 200 of users who enable roaming or who will potentially be roaming.

The SPD Collection App 208 is activated in step 1120 upon attachment of the user terminal 200 (i.e., Terminal 2) to a visited network. In the exemplary scenario illustrated in FIG. 10 this will be the network of Operator 2. Of course, the actual activation can be performed in alternative ways, for example upon receipt of a data collection start command from the visited network.

Once the SPD Collection App 208 has been activated in step 1120, it starts to collect and store relevant SPD for voice services and circuit-switched services in step 1130. The stored SPD could either remain on the user terminal 200 or may be reported to one or both of the home network and the visited network in response to detection of a data reporting condition by the user terminal 200.

For example, the following further steps may be initiated in case a notification regarding improper charging or service quality problems in the visited network is reported to the CCDA apparatus 102 of the home network by a user of Terminal 2 (step 1140). In response to such a notification, a customer care ticket may be generated by the CCDA apparatus 102.

First, in step 1150, the home network collects the own charging data for the required period. Step 1150 makes it possible to collect reference information in the home network, possibly also for SPD validation (although it might not be used later if more useful charging data or SPD is provided by the user terminal 200).

In step 1160, the CCDA apparatus 102 collects for the roaming period the charging and performance data available from the visited network. If the case (e.g., a customer complaint of which the CCDA apparatus 102 was notified in step 1140) can be settled based on the charging and performance data reported by the visited network, the customer care ticket generated by the CCDA apparatus 102 in step 1140 is closed in step 1170. If, on the other hand, the CCDA ticket cannot be closed (e.g., because the charging and performance data are not available), if the corresponding data are needed online or if the data are not in agreement with the user complaint, further procedures are initiated starting with step 1180.

Specifically, in step 1190 the CCDA apparatus 102 of the home network obtains the previously collected SPD via the CCDA interface either from the SPD Collection App 208 directly or from a central data repository, such as the NMS 1050. Then, in step 1200, the SPD thus obtained are analyzed online by the CCDA apparatus 102 for the roaming user terminal 200 for which the notification has been received in step 1140. This analysis will in particular involve an SLA validation as explained above.

Based on the result of the SPD analysis and SLA validation, the notification is answered in step 1210. For example, a charging or performance-related disagreement may be reported to the visited network based on the SPD analysis in step 1220. Moreover, in step 1230, the home operator answers the notification received in step 1140 based on the agreement with the visited operator. As an example, if there is a discrepancy between the roaming SLA between the home operator and the visited operator on the one hand and the SLA between the subscriber and the home operator on the other (e.g., because the SLA grants higher data rates than the roaming SLA), the subscriber may be informed accordingly. Finally, the customer care ticket may be closed.

Figure 11:
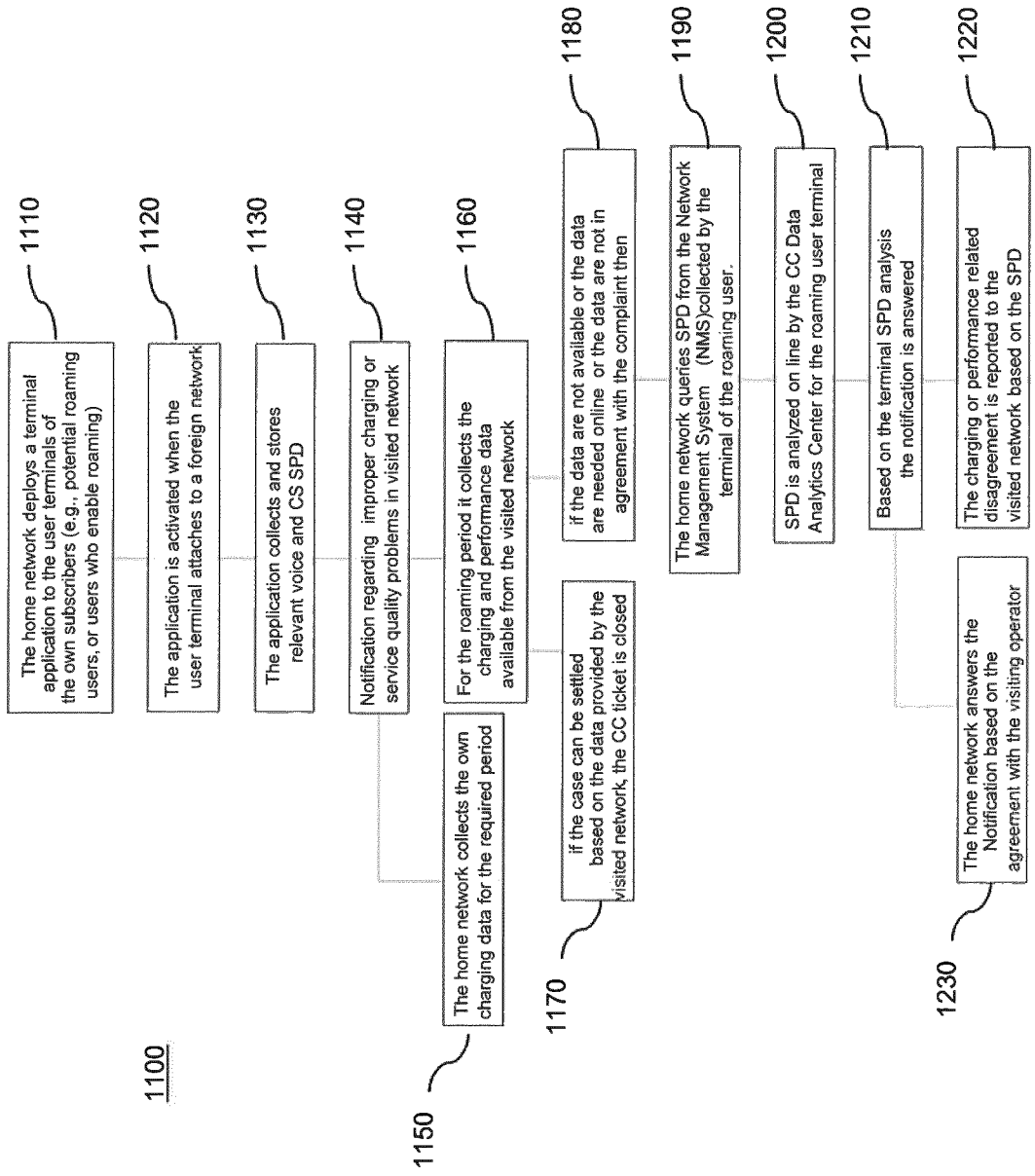
FIG. 11 shows a flow diagram of a further method embodiment.

A possible use case scenario for the preceding embodiments, in particular as illustrated in FIGS. 10 and 11, can be a roaming user terminal 200 having voice-over-LTE (VoLTE) capabilities. It will be assumed further that the user has an SLA with the home operator that permits the use of VoLTE services.

The roaming user terminal 200 is located in an area of the visited network with LTE coverage. When the user terminal 200 initiates a call, the signal strength is thus high enough to set up a VoLTE call. But due to interference there is a relatively high packet loss in the radio link and, therefore, the voice quality is bad. The user does not understand the called party and terminates the call. After the call has been terminated, the user attempts six times to establish the call anew, but two times the call setup is unsuccessful and four times the voice quality is bad. During all these processes the relevant SPD are collected and stored by the user terminal 200 (see, e.g., step 1130 in FIG. 11).

At a later point in time the user contacts the customer care service system of his or her home operator and complains about the voice quality and unsuccessful call setups (see, e.g., step 1140 in FIG. 11). Moreover, the user sees that all calls were billed, even the unsuccessful ones.

Based on the SPD accessibility data reported by the user terminal 200 for the roaming period, the CCDA apparatus 102 of the home network may identify that there were two unsuccessful and four successful call setups in the roaming period (see, e.g., step 1200 in FIG. 11). All calls were initiated and made in LTE. The SPD also indicate that the radio quality was pure during the calls and the packet loss rate and the packet delay in certain periods were high. Consequently, the estimated MOS was low for the successful calls. Accordingly, the CCDA apparatus 102 may identify an SLA violation as the guaranteed VoLTE services could not properly be provided in the visited network. From the 3G (e.g., UMTS) radio performance data it is also identified that the 3G radio quality is good.

Based on the analysis made by the CCDA apparatus 102, a customer care agent may explain the cause of the problem to the user, and the charging record may be adapted accordingly (see, e.g., step 1210 in FIG. 11). Additionally, it may be explained to the user that if he or she experiences similar issues in the future, it might be an option to turn off the LTE preference in the user terminal 200 as a better voice quality is expected when the call will be made in 3G. The operator of the visited network may be informed accordingly via a corresponding notification (see, e.g., step 1220 in FIG. 11).

In the above use case scenario, the following items of SPD may be analyzed for the investigated subscriber and the investigated roaming period:

Call attempts: 6
Unsuccessful call attempts: 4
Abnormal call releases: 0
RAT (Radio Access Technology): LTE
QCIs: 1
RSRP: <−110 dBm
RSRQ: <−10 dB
RSCP: >−110 dBm
Ec/No: >−10 dB
MOS: <3

The use case scenario described above can address the problem that the voice and circuit-switched data roaming users are not visible in the home network, but only in the visited network. The following use case scenario addresses the problem that packet-switched data roaming users are not visible in the visited network, which means that the visited network requires the associated SPD from the roaming user terminals 200 for customer care purposes.

Figure 12:
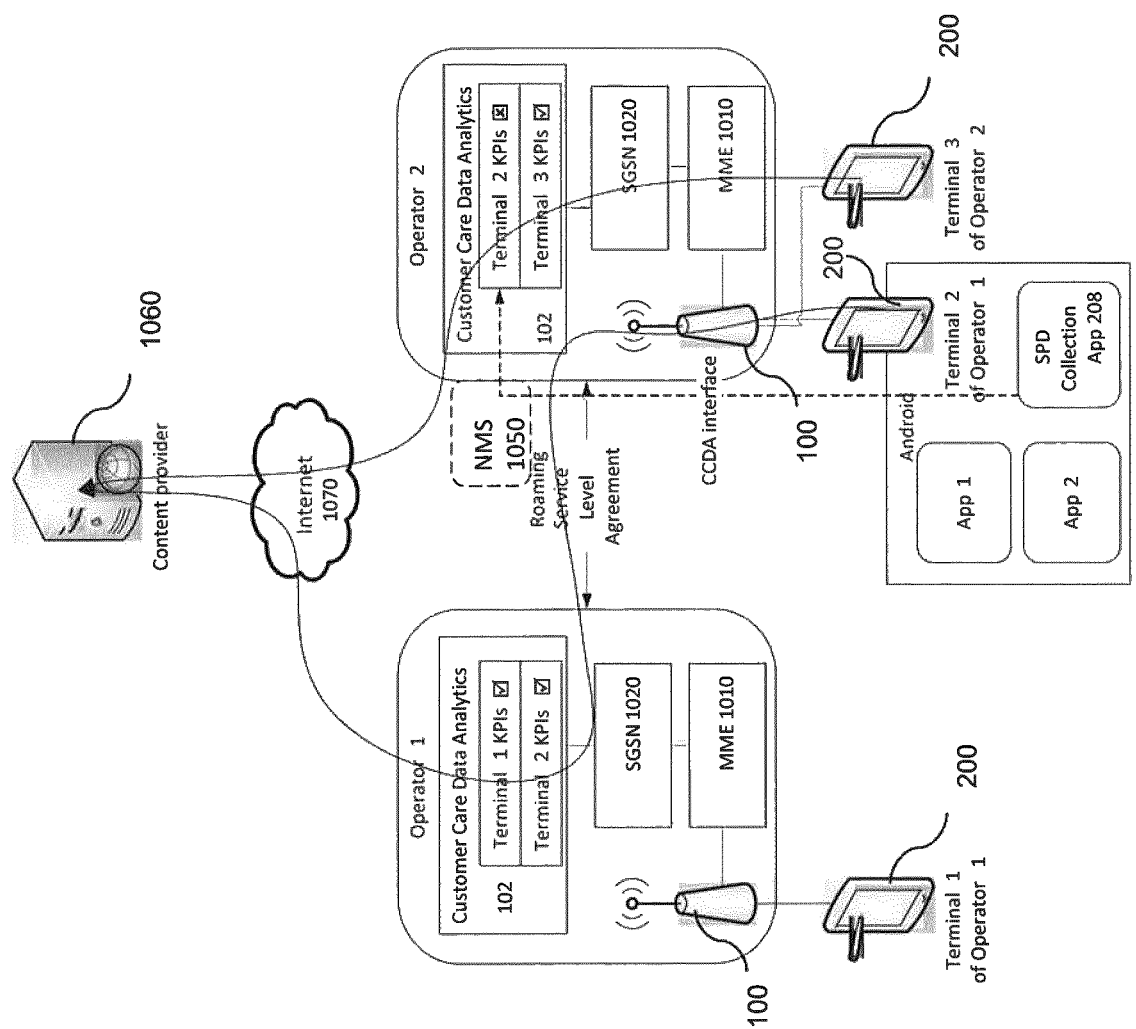
FIG. 12 shows a schematic block diagram of a further communication system embodiment.

In a corresponding packet-switched data roaming scenario illustrated in FIG. 12, the SPD Collection App 208 of Terminal 2 interfaces the CCDA apparatus 102 of the visited network (either directly or via the NMS 1050). In FIG. 12, it is assumed that the packet-switched services are streaming or other multimedia-related content services provided by an external server 1060 via the Internet 1070. The associated packet-switched data are routed via the core network portion of the home network as well as the access network portion of the visited network to the user terminal 200 with the SPD Collection App 208 (i.e., Terminal 2). The corresponding data path thus deviates from the data path experienced by a non-roaming user terminal 200 (such as Terminal 3; see the corresponding lines in FIG. 12).

Figure 13:
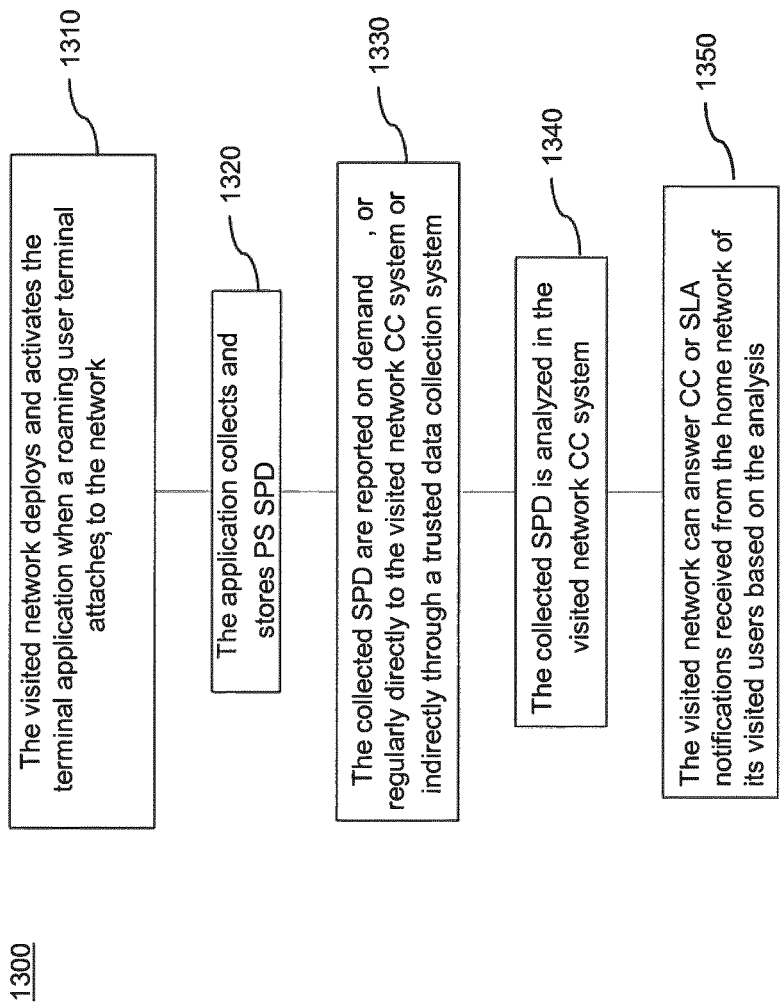
FIG. 13 shows a flow diagram of a still further method embodiment.

FIG. 13 illustrates a flow diagram 1300 of a method embodiment that may be performed in connection with the provision of packet-switched services as depicted in FIG. 12. The method embodiment may in particular be performed in connection with the apparatus embodiments depicted in FIGS. 6 and 9.

In step 1310, the visited network deploys and activates the SPD Collection App 208 on the roaming user terminal 200 (i.e., Terminal 2). The SPD Collection App 208 will in the present case be activated upon attachment of the user terminal 200 to the visited network.

Responsive to its activation, the SPD Collection App 208 collects and stores the relevant SPD for packet-switched services in step 1320. The collected SPD are reported on demand (e.g., upon receipt of a data reporting command from the visited network) or regularly (e.g., upon expiry of a predefined data reporting interval started upon activating the application 208 and/or periodically re-started) to the CCDA apparatus 102 of the visited network (step 1330). The reporting could also indirectly occur through a trusted data collection system and/or the NMS 1050.

In step 1340, the collected SPD is analyzed by the CCDA apparatus 102 as explained above (see, e.g., FIGS. 6 and 9). Then, in step 1350, the visited network can answer customer care or SLA notifications received from the home network of the roaming user terminals 200 based on the analysis in step 1340.

In a possible use case scenario of the provision of packet-switched services as shown in FIGS. 12 and 13, the visited operator may receive a notification from the home operator that some of the roaming user terminals 200 have experienced an unsatisfactory video quality or web browsing speed in the visited network. The suspected root cause may be a poor radio quality (e.g., prior to step 1330 and/or 1340 in FIG. 13).

In response to such a notification, the CCDA apparatus 102 may obtain the SPD from the roaming user terminal 200 and check associated KPIs, such as video KPIs (MOS, stall-time ratio, video starting time and so on) and web KPIs (see, e.g., step 1330 in FIG. 13). The corresponding KPIs may be compared with the KPIs of the own (non-roaming) user terminal 200. The radio quality is also analyzed. The result of the analysis may be that the video and web KPIs of the roaming users are significantly worse than those of the own (non-roaming) users and that the reason for this is not the radio network. Accordingly, the visited operator may answer the notification in that the bottleneck is not in the visited network (see, e.g., step 1350 in FIG. 13).

In connection with the corresponding analysis in step 1340, the following items of SPD may be considered:

RAT: LTE
QCIs: 5
ECI-s
RSRP for roaming subscribers: >−110 dBm
RSRP for home subscribers: >−110 dBm
RSRQ for roaming subscribers: >−10 dB
RSRQ for home subscribers: >−10 dB
Video MOS for roaming subscribers: <3
Video MOS for home subscribers: >3
Stall time ratio for roaming subscribers: >0.1
Stall time ratio for home subscribers: <0.01
Video buffering ratio for roaming subscribers: >0.1
Video buffering ratio for home subscribers: <0.01
Start time for roaming subscribers: >10
Web page access time for roaming subscribers: >5 s
Web page access time for home subscribers: <5 s
Web page access success rate for roaming subscribers: <0.9
Web page access success rate for home subscribers: >0.95

Another use case scenario is when the home operator collects session level and performance-related data from many (previously) roaming user terminals 200 in order to analyze the roaming SLA illustrated in FIGS. 10 and 12. Such an analysis requires to obtain SPD for SLA validation from the users terminals 200. The corresponding SPD may be collected either online or offline when the user terminals 200 are in the home network, or within WiFi coverage.

For roaming SLA validation, the home operator may collect basic KPIs, such as call success rate, drop rate, call duration, and so on for the roaming user terminals 200. It may, for example, turn out that the unsuccessful call setup rate and the average call setup time are higher than the corresponding values as defined in the roaming SLA. The home operator may continue to collect more detailed information from the mobile terminals 200, including radio environment data and IP Multimedia Sub-system (IMS) signaling time information and compare them with the corresponding roaming SLA criteria and, optionally, own reference data. Likewise, the home operator may compare the number of billed calls and the number of successful calls.

In one variant, the corresponding analysis may highlight that the radio environment is relatively good in the visited network and that there is no correlation between the radio-related parameters and the increased number of call setup failures or the longer call setup times. However, upon investigating the timing of the IMS signaling messages it may turn out that the radio bearer setup takes longer than, for example, certain reference data (e.g., as taken from the home network). The home operator may thus conclude that the long call setup time is due to a processing delay in the Policy and Charging Rules Function (PCRF). It may also be identified that the call setup failures are mostly due to a time-out of the PCRF slow answer.

In a next step, the home operator may determine the effected number of users (e.g., for notification purposes). It may also turn out that the unsuccessful call attempts have been charged. As a result, the home operator may contact the partner operator and indicate the roaming SLA violation. The corresponding notification may be supported with the reported SPD and the CCDA analysis results. The partner operator may then take the necessary steps to fix the technical problems. Additionally, also a compensation for the roaming SLA violation and the corresponding overcharging may be obtained.

In connection with the corresponding use case scenario, the one or more of the following items of SPD may be collected and analyzed.

RAT: LTE
QCIs: 1
ECI-s
RSRP for roaming subscribers: >−110 dBm
RSRP for own home subscribers: >−110 dBm
RSRQ for roaming subscribers: >−10 dB
RSRQ for own home subscribers: >−10 dB
Number of successful call setup rate for roaming subscribers: 110
Unsuccessful call setup rate for roaming subscribers: >0.1
Unsuccessful call setup rate SLA criterion: <0.05
Abnormal call release ratio for roaming subscribers: <0.05
Abnormal call release ratio SLA criterion: <0.05
Call duration for roaming subscribers: 4 min
Call duration for own home subscribers: 5 min
Call setup time for roaming subscribers: >7 s
Call setup time SLA criterion: <5 s
Time report of calls setup procedure for roaming subscribers
Time report of calls setup procedure for own home subscribers In all the embodiments presented above, one or more of the following items of SPD may be collected, reported and analyzed:

Call-related KPIs: call success, failure, call duration, voice quality, call setup time (typical network data sources are IMS, Call Data Record (CDR), A Interface (IF), Iu-CS IF).
Packet-switched service KPIs: Video MOS, video freeze rate, stall time ratio, web access time, time to first byte, TCP throughput (GTP-U protocol, S1, IU-PS IFs)
Radio environment-related KPIs: RSRP, RSCP, RSRQ, EcNo, Radio Link Control (RLC) packet loss, frame, or block error rate (GPEH, CTR)
User identification data: IMSI, MSISDN, mapping to IP address or other IDs (EBM, Core network logs, GTP/C protocol, S1 IF)
Location data: MNC, MCC, LAC, TAC, CI, ECI, GPS coordinates (GTP/C protocol, S1 IF, location server)

The items of SPD available in the user terminals 200 may be classified according to the network node origin and IFs, thus providing the type of information that is missing from the data readily available within the network. The main goal of the following classification is to generate a similar data format of the terminal output record as the one generated by the network or IF adapters of a Performance Management (PM) system. In this way the correlator of the PM system (e.g., forming a part of the CCDA apparatus 102) is able to correlate the terminal data with the network data in connection with, for example, the SLA analysis.

The terminal-collected SPD is classified to the following classes:
1) RAN
2) A, Iu-CS IFs
3) IMS
4) GTP-C
5) GTP-U
6) SPR
7) SGW
8) PDN-GW
9) Traffic Detection Function (TDF)
10) MME, SGSN
11) Location The following items of SPD may be collected and reported by the mobile terminals 200 (e.g., the SPD Collection App 208) in the above classes:
1) RAN Class The mobile terminals 200 can gather RAN-related events from their modem. The modem is a standalone separated device in each mobile terminal 200. The mobile terminal 200 communicates with the modem device via AT commands. RAN-related information can be gathered from the modem via AT commands. Such as
handover
radio environment reports
radio bearer
2) A and Iu-CS IF Class 2G and 3G call and SMS related KPIs, indicating the number of calls, call attempts, timing info (start, end time, duration), info about supplementary services (call forwarding, etc.).
3) IMS Class
Subscriber Identifier—typically the MSISDN (Mobile Subscriber Integrated Services Digital Network-Number) of the user
IP address of the mobile terminal 200
Media Type, Media Format (e.g., media format sub-field of the media announcement and all other parameter information (a=lines) associated with the media format)

Flow description (e.g., source and destination IP address, port numbers and the protocol)
AF Application Identifier
Flow status (for gating decision)
Priority indicator, which may be used by the PCRF to guarantee service for an application session of a higher relative priority
4G call setup, release and registration
4) GTP-C Class
IMSI (International Mobile Subscriber Identifier) of the user
Network attach
Bearer creation
PDP context related info
5) GTP-U Class
Bandwidth, throughput
Web video KPIs
Packet loss, jitter, delay
MOS
6) SPR Class
Subscriber's charging related information
Spending limits profile containing an indication that policy decisions depend on policy counters available at the OCS that has a spending limit associated with it and optionally the list of relevant policy counters
Subscriber category
Subscriber's usage monitoring related information
7) SGW Class
The SGW can provide information about the access technology changes.
8) PDN-GW Class
Information on non-3GPP related access technology can be gathered at the PDN-GW. The operator can either have a managed WiFi deployment of which traffic can be monitored here or the user terminal 200 can connect to non-managed hotspots as well. In both cases if the user terminal 200 connects to a WiFi hotspot then all information about the traffic that goes on the WiFi connection is lost.
9) TDF Class
The TDF node is responsible to provide information about the originating OTT applications generating traffic to the phone.
10) MME, SGSN class
Handover related info
Routing and tracking area update info
PDP context related info
Moreover, the user terminal 200 can collect additional items of SPD that are either not available directly in network nodes or IFs, or difficult to obtain. This relates in particular to the following SPD in the following classes:
RAN Class
In Android devices, the rild daemon is responsible for the communication between the OS and the modem. With a custom rild daemon, the RAN-related event information collection could be feasible. Higher level of information can be gathered from the TelephonyManager (call success, failure, call duration, voice quality, call setup time).
IMS, GTP-C, GTP-U Class
In Android, traffic statistics counters and IMSI-related data can be queried via the net related packages
SGW Class
Access technology information 2G/3G can also be gathered by the ConnectivityManager
TDF Class The foreground processes, the list of open sockets, and the corresponding applications can be queried in the Android system for providing the necessary information to the CCDA apparatus 102.
ActivityManager am=(ActivityManager)
AppService.this.getSystemService(ACTIVITY_SERVICE);
//The first in the list of RunningTasks is always the foreground task.
RunningTaskInfo
foregroundTaskInfo=am.getRunningTasks(1).get(0);
Example for packet-level KPIs: Video MOS, video freeze rate, stall time ratio, web access time, time to first byte, TCP throughput. (GTP-U protocol, S1, IU-PS IFs)
Location Services Class
Location related information can be queried in the location packageEmbodiment—Update (reporting) methods
SPD reporting (e.g., by the SPD Collection App 208) may be performed in the above embodiments in various ways, including:
i. Correlation in the Terminal and Report Generation
The user terminal 200 collects the SPD from the different terminal entities, tags them with timestamps and user identification (IMSI) to create one or more data records and generates a report (or complex message) in a predefined format that can be processed by the network apparatus 102. The reports consist of information blocks that corresponds to the classes described above.
ii. Update on Change
The user terminal 200 can update the network apparatus 102 whenever a change occurs in the terminal 200. The various items of SPD have various update rates. The subscription information may change on a monthly or yearly basis, while the open socket list can change on ~10 secs granularity.
iii. Periodic Update
The user terminal 200 can periodically send a status report to the network apparatus 102.
The periodic update has the advantage over the event-based update that the load on the system can be calculated in advance. The downside of this solution is that it introduces a delay in the data timeliness.
iv. Query by the Network Apparatus 102
The user terminal 200 can be queried by the network apparatus 102 about the required data. This is the most focused way of communication of the required data from the terminal to the analytics system.
In all the above embodiments, the terminal is aware of all the information. Privacy issues can be addressed by user consent. Such solution is preferred that can be switched on and off, and the user is aware of the information content that is sent out from his or her user terminal 200.
As has become apparent from the above embodiments, the technique presented herein permits network operators to answer customer care complaints for roaming users based on a detailed analysis. Also, incorrect charging for roaming users can be properly identified. Notifications and SPD can be transmitted along network operators to support performance and root caused analysis.
Many advantages of the present invention will be fully understood from the foregoing description, and it will be apparent that various changes may be made in the form, construction and arrangement of the steps, units and devices described above and without departing from the scope of the invention or without sacrificing all of its advantages. Since the invention can be varied in many ways, it will be recognized that the invention should be limited only by the scope of the following embodiments.

The invention claimed is:

1. A method of validating a Service Level Agreement (SLA) for a user terminal, the method comprising a home network of the user terminal:
    obtaining Service level related Performance Data (SPD) that have been collected by the user terminal while roaming in a visited network, wherein the SPD pertain to circuit-switched services provided in the visited network;
    obtaining subscription information associated with the user terminal and indicative of an SLA; and
    validating the SLA based on a comparison of the SPD, or data derived therefrom, with the subscription information;
    receiving, from the visited network and for the user terminal, a report pertaining to at least one of charging data and performance data; and
    validating:
        the SPD collected by the user terminal based on the performance data, or vice versa; and/or
        the charging data in the report based on the collected SPD, or vice versa.

2. The method of claim 1, wherein at least the validating is performed responsive to a request message from a user of the user terminal.

3. The method of claim 2, wherein at least one of the SPD and the subscription information are obtained responsive to the request message.

4. The method of claim 1, further comprising sending a notification message to a user of the user terminal if an SLA violation is identified upon validating the SLA.

5. The method of claim 1, further comprising:
    excluding the SLA from validation dependent on a result of the SPD validation; and/or
    sending a notification message to an operator of the visited network dependent on a result of the charging data validation.

6. The method of claim 5, wherein the notification message sent to the operator of the visited network comprises the collected SPD or data derived therefrom.

7. The method of claim 1, further comprising:
    repeatedly validating a respective SLA for multiple user terminals that have been roaming in the visited network to derive SLA violation data; and
    validating a roaming SLA for the visited network based on the SLA violation data.

8. The method of claim 7, further comprising sending a notification message to an operator of the visited network if a roaming SLA violation is identified upon validating the roaming SLA.

9. A method of reporting Service level related Performance Data (SPD) collected for a user terminal while roaming, the method comprising the user terminal:
    detecting a data collection start condition;
    starting, in response to detecting the data collection start condition, collection of SPD for circuit-switched services provided in a visited network to the roaming user terminal;
    detecting a data reporting condition, wherein the data reporting condition is an attachment of the user terminal to the home network; and
    reporting, in response to detecting the data reporting condition, the collected SPD, wherein the collected SPD is reported to or via a home network of the user terminal.

10. The method of claim 9, wherein the data collection start condition is:
    an attachment of the user terminal to the visited network; and/or
    receipt of a data collection start command from the visited network.

11. The method of claim 9, further comprising:
    detecting a data collection stop condition; and
    stopping, in response to detecting the data collection stop condition, collection of the SPD for services provided in the visited network to the roaming user terminal.

12. The method of claim 11, wherein the data collection stop condition is:
    receipt of a data reporting command from the visited network;
    a detachment of the user terminal from the visited network;
    expiry of a data reporting interval; and/or
    receipt of a data collection stop command from the visited network.

13. The method of claim 9, wherein the collected SPD is reported to a Network Management System.

14. The method of claim 9, wherein the collected SPD is reported to or via the visited network.

15. The method of claim 14, wherein the collected SPD is reported via the visited network to a trusted entity.

16. The method of claim 9:
    further comprising collecting supplemental data in association with the SPD;
    wherein the supplemental data comprise:
        position data for the roaming user terminal;
        user identification data;
        a time stamp; and/or
        radio environment data.

17. The method of claim 16:
    wherein one or more items of the supplemental data are collected at substantially the same time as one or more items of SPD; and
    further comprising associating the one or more supplemental data items and the one or more SPD items collected in a data record.

18. An apparatus configured to validate a Service Level Agreement (SLA) for a user terminal, the apparatus being located in a home network of the user terminal and comprising:
    processing circuitry;
    memory containing instructions executable by the processing circuitry whereby the apparatus is operative to:
        obtain Service level related Performance Data (SPD) that have been collected by the user terminal while roaming in a visited network, wherein the SPD pertain to circuit-switched services provided in the visited network;
        obtain subscription information associated with the user terminal and indicative of an SLA; and
        validate the SLA based on a comparison of the SPD, or data derived therefrom, with the subscription information;
        receive, from the visited network and for the user terminal, a report pertaining to at least one of charging data and performance data; and
        validate:
            the SPD collected by the user terminal based on the performance data, or vice versa; and/or
            the charging data in the report based on the collected SPD, or vice versa.

19. A user terminal configured to report Service level related Performance Data (SPD) collected by the user terminal while roaming, the user terminal comprising:
- processing circuitry;
- memory containing instructions executable by the processing circuitry whereby the user terminal is operative to:
  - detect a data collection start condition;
  - start, in response to detecting the data collection start condition, collection of SPD for circuit-switched services provided in a visited network to the roaming user terminal;
  - detect a data reporting condition, wherein the data reporting condition is an attachment of the user terminal to the home network; and
  - report, in response to detecting the data reporting condition, the collected SPD, wherein the collected SPD is reported to or via a home network of the user terminal.

* * * * *